US009469514B1

(12) United States Patent
Hendricks

(10) Patent No.: US 9,469,514 B1
(45) Date of Patent: Oct. 18, 2016

(54) REMOTE HITCH PIN ACTUATOR

(71) Applicant: Roger L. Hendricks, Carey, OH (US)

(72) Inventor: Roger L. Hendricks, Carey, OH (US)

(*) Notice: Subject to any disclaimer, the term of this patent is extended or adjusted under 35 U.S.C. 154(b) by 0 days.

(21) Appl. No.: 14/717,086

(22) Filed: May 20, 2015

Related U.S. Application Data

(60) Provisional application No. 62/047,259, filed on Sep. 8, 2014.

(51) Int. Cl.
*B60D 1/26* (2006.01)
*B66F 9/075* (2006.01)

(52) U.S. Cl.
CPC .................................. *B66F 9/07504* (2013.01)

(58) Field of Classification Search
CPC .......... B60D 1/26; B60D 1/02; B60D 1/025; B66F 9/07504
See application file for complete search history.

(56) References Cited

U.S. PATENT DOCUMENTS

| | | | |
|---|---|---|---|
| 2,671,673 | A | 3/1954 | Benson |
| 4,484,760 | A | 11/1984 | Rach |
| 4,560,184 | A | 12/1985 | Williams, Jr. |
| 5,413,369 | A | 5/1995 | Trent |
| 5,580,076 | A | 12/1996 | DeRoule et al. |
| 6,047,982 | A | 4/2000 | McClure et al. |
| 7,322,594 | B2 | 1/2008 | Liljeblad et al. |
| 8,047,559 | B2 | 11/2011 | Harlin |
| 8,376,388 | B2 | 2/2013 | Graber et al. |
| 2013/0277943 | A1 | 10/2013 | Wendte et al. |

*Primary Examiner* — Kevin Hurley
*Assistant Examiner* — Gabriela C Craciun
(74) *Attorney, Agent, or Firm* — Robert C. Montgomery; Montgomery Patent & Design

(57) ABSTRACT

An actuator adapted to remotely actuate a hitching mechanism attaches a towed vehicle such as a trailer to a forklift fork. The actuator is adapted to allow an operator of the forklift to remotely engage and disengage the hitch pin from the connection device of the towed vehicle without dismounting the forklift.

20 Claims, 5 Drawing Sheets

REMOTE HITCH PIN ACTUATOR

RELATED APPLICATIONS

The present invention was first described in and claims the benefit of U.S. Provisional Application No. 62/047,259 filed Sep. 8, 2014, the entire disclosures of which are incorporated herein by reference.

FIELD OF THE INVENTION

The present invention relates generally to an actuator adapted to remotely actuate a hitching mechanism attaching a towed vehicle to the fork of a forklift.

BACKGROUND OF THE INVENTION

The common forklift is a very useful piece of equipment that receives constant and ubiquitous use daily around the world. It is used to transport multiple small objects, bulky objects, and even heavy objects weighing several tons with ease. Although not an intended use, it is often seen moving trailers or totes short distances, or jockeying them into tight locations. Such instances occur where a conventional tow vehicle cannot fit, or is not readily available. In these unconventional a trailer or tote is secured to the top of the fork by use of a drop-in pin.

When a forklift is put to this use, an operator of the fork lift must dismount the vehicle every time a trailer or tote is hitched or unhitched. This necessarily translates into much lost time over the course of a day, and also subjects the operator to safety hazards such as slips, falls, pinch points, etc.

Accordingly, there exists a need for a means by which a trailers and totes can be easily hitched and unhitched to a forklift without the disadvantages as described above. The use of the remote hitch pin actuator allows for movement of trailers via a forklift in a manner which is quick, easy, and effective.

SUMMARY OF THE INVENTION

The inventor has recognized the aforementioned inherent problems and lack in the art and observed that there is a need for a remote hitch pin actuator.

It is therefore an object of the invention to provide an actuator comprising a base weldment configured to be affixed to a fork portion of a forklift, an arm weldment pivotally attached to the base weldment, a hitch pin rotatingly attached to the arm weldment and a cable which has a first end attached to a handle and a second end attached to the arm weldment. The cable operably controls the arm weldment to guide the hitch pin through the aligned apertures of the fork portion and a vehicle to secure the vehicle to the forklift. The cable is routed so as to locate the handle adjacent to an operator cab of the forklift.

The base weldment further comprises a base member having a fork aperture capable of being aligned with the fork portion, first post upstanding from a first side of the base member, a second post upstanding from a second side of the base member, a stop plate affixed to distal ends of the first and second posts and a fastening means for mounting the base member to the fork portion. The base weldment may also comprise a hollow base member.

The first and second posts are spaced apart to allow positioning of the arm weldment there between and the stop plate which provides a mechanical limitation to maintain the arm weldment in a forwardly biased state out and away from a center line of the forklift. The fastening means is a plurality of "T"-bolts and a plurality of welded nut fasteners. The hitch pin is rotatingly guided through a first pin aperture of the forklift and through an aligned second pin aperture portion of the vehicle. The base is sized and shaped to be aligned onto a standard OSHA recognized fork classes (1-7).

The first post and the second post are arranged in a mirror-image and a parallel manner and the arm weldment is positioned between the first post and the second post. A threaded fastener is configured to pass through the fastener apertures when aligned within the arm weldment, the first post and the second post and secured thereto.

The stop plate is shaped as an inverted "U"-shape and is welded to the first post and the second post. The stop plate includes an inner slot portion and provides a clearance for the arm weldment to pivot upwardly when the hitch pin is engaged. The cable is routed through at least one (1) guiding eyelet mounted to the forklift and attached to a cable bracket portion of the arm weldment.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 4:
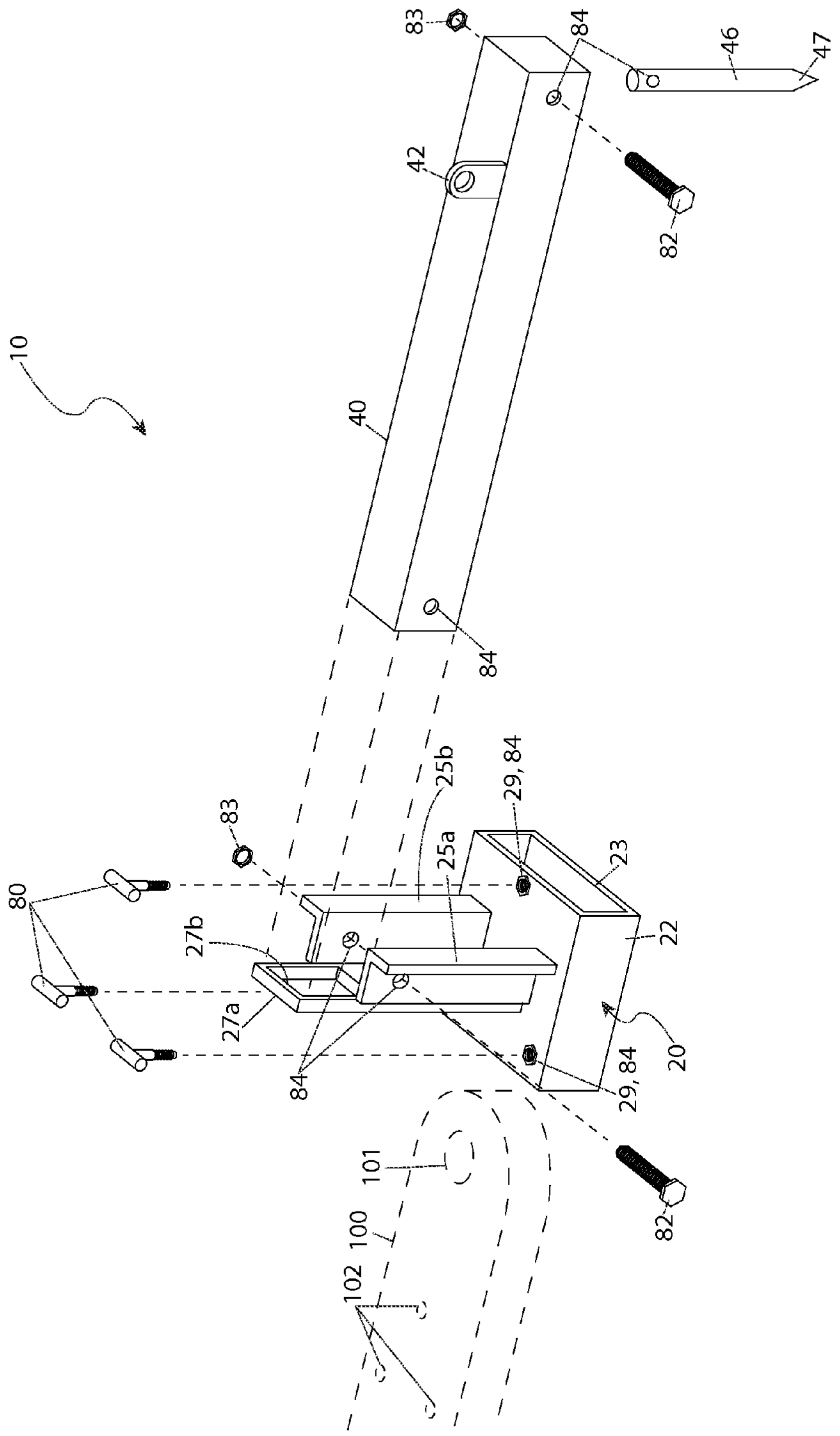
Figure 5:
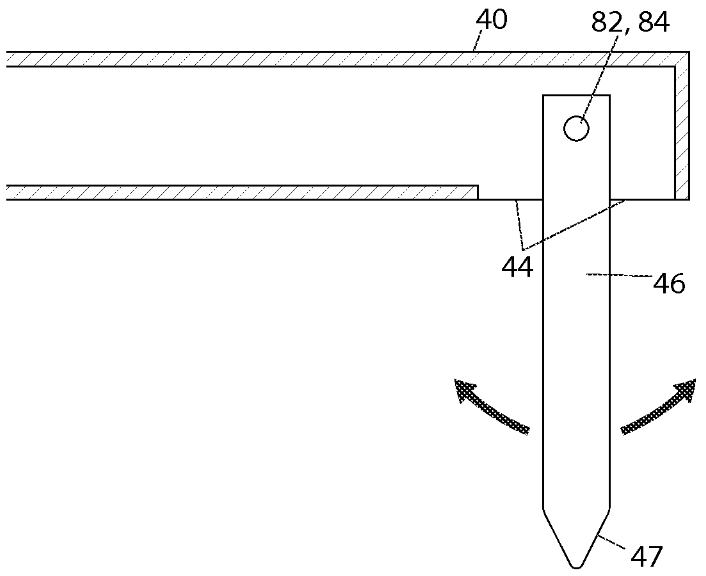

FIG. **3*a* is another environmental view of the actuator 10** depicting an engaged state, according to a preferred embodiment of the present invention;

FIG. **3*b* is yet another environmental view of the actuator 10** depicting a released state, according to a preferred embodiment of the present invention;

FIG. 4 is an exploded view of the actuator 10, according to a preferred embodiment of the present invention; and, FIG. 5 is a sectional view of a hitch pin portion 46 of the remote hitch pin actuator 10 taken along section line A-A (see FIG. 1), according to a preferred embodiment of the present invention.

DESCRIPTIVE KEY

10 remote hitch pin actuator
20 base weldment
22 base
23 fork aperture
**25*a*** first post
**25*b*** second post
**27*a*** stop plate
**27*b*** slot
29 welded nut fastener
40 arm weldment
42 cable bracket
44 pin opening
46 hitch pin
47 point
50 cable
52 eyelet
54 handle
80 "T"-bolt

82 threaded fastener
83 nut fastener
84 fastener aperture
100 fork
101 first pin aperture
102 receiver aperture
105 towed vehicle
106 second pin aperture
110 forklift

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a remote hitch pin actuator (herein described as the "apparatus") 10, which provides a means of rapid hitching and unhitching of a towed vehicle 105, such as a trailer or a tote, by an operator of a forklift 110 for subsequent pulling or pushing. The apparatus 10 is mounted to a tip of a fork portion 100 of the forklift 110 and is held in place by a base weldment 20 which is fastened to the fork 100.

Figure 1:
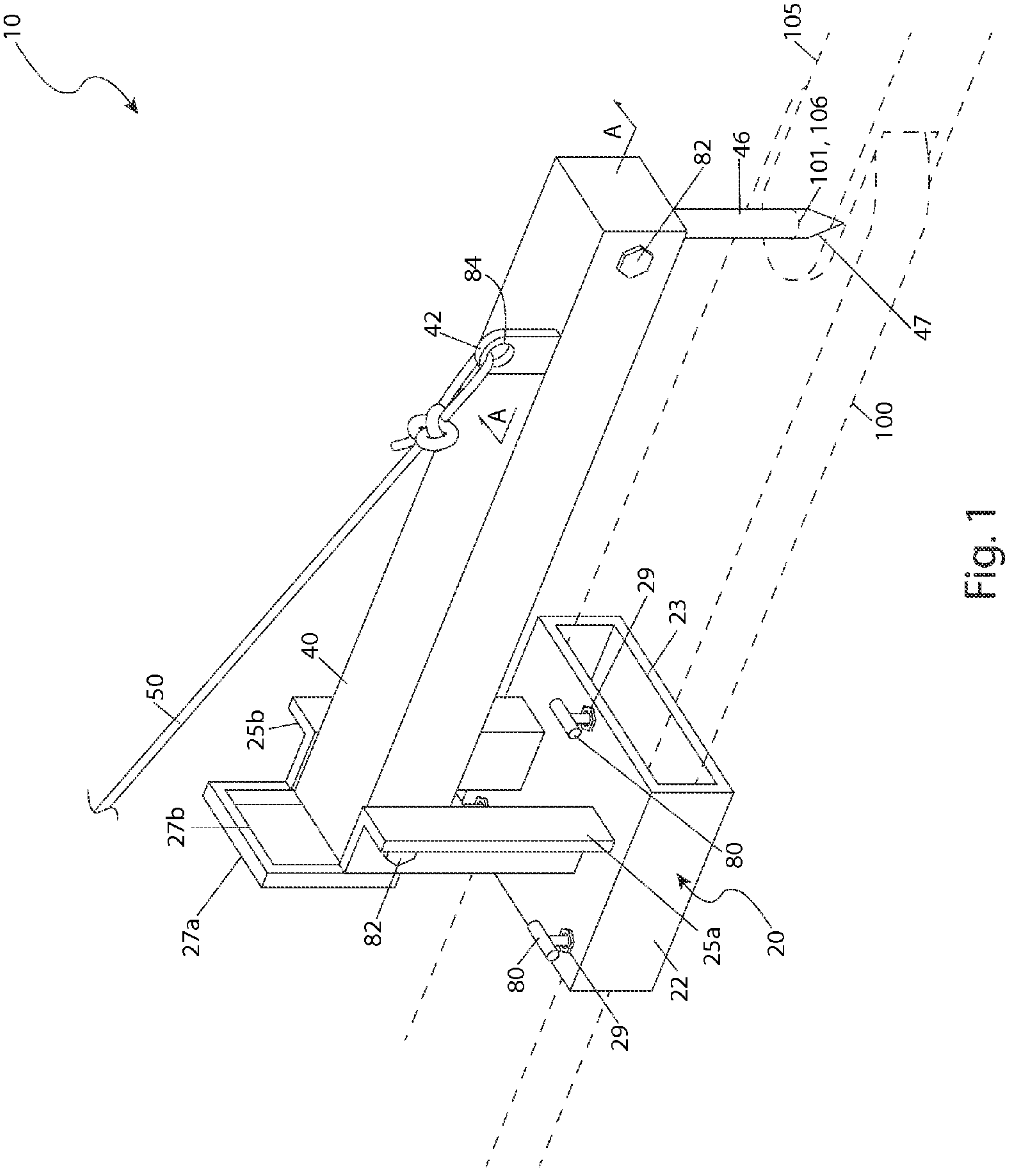
FIG. 1 is a perspective view of a remote hitch pin actuator 10, according to a preferred embodiment of the present invention.

Referring now to FIG. 1, a perspective view of the apparatus 10, according to a preferred embodiment of the present invention, is disclosed. The apparatus 10 includes a base weldment 20 having a pivotally attached arm weldment 40. The base weldment 20 secures the apparatus 10 to a fork portion 100 of a forklift 110, and the pivoting arm weldment 40 guides a rotatingly attached hitch pin 46 downward through a first pin aperture portion 101 of a forklift 110, and through an aligned second pin aperture portion 106 of a towed vehicle 105 to join the vehicles 110, 105 together.

The base weldment 20 includes a hollow rectangular base 22, a first post 25*a*, a second post 25*b*, and a plurality of "T"-bolts 80. The base 22 is made using a section of rectangular structural tubing approximately one foot (1 ft.) long, having a central rectangular fork aperture 23 extending therethrough. The fork aperture 23 is to be sized and shaped so as to be capable of aligning onto a standard OSHA recognized fork 100 classes one (1) through seven (7). An embodiment of the posts 25*a*, 25*b* is shown here utilizing a pair of welded and upwardly extending lengths of angle iron, being arranged in a mirror-image and parallel manner, and spaced apart to allow positioning of the arm weldment 40 in between. A threaded fastener 82 such as a bolt passes through aligned fastener apertures 84 formed or machined within the arm weldment 40 and the post 25*a*, 25*b* portions, and is secured using a nut fastener 83. It is understood however, that the posts 25*a*, 25*b* may be made using other linear metal forms such as channel or rectangular tube shapes, and as such should not be interpreted as a limiting factor of the apparatus 10.

The posts 25*a*, 25*b* are connected along rearward top portions by an inverted "U"-shaped stop plate 27*a* welded therebetween. The stop plate 27*a* includes an inner slot portion 27*b*. The stop plate 27*a* acts as a mechanical limitation to maintain the arm weldment 40 in a forwardly biased state out and away from the center line of the forklift 110. When disengaging the hitch pin 46 from the fork 100 a user releases the arm weldment 40 and engages the hitch pin 46 by applying slack to an attached cable 50. The slot 27*b* provides clearance for the arm weldment to pivot upwardly during engagement of the hitch pin 46 (also see FIGS. 2, 3*a*, and 3*b*).

The apparatus 10 provides secure and repeatable positioning when mounted to the fork 100 via a plurality of "T"-bolts 80 and welded nut fasteners 29 mounted to a top surface of the base 22 (see FIG. 4).

Figure 2:
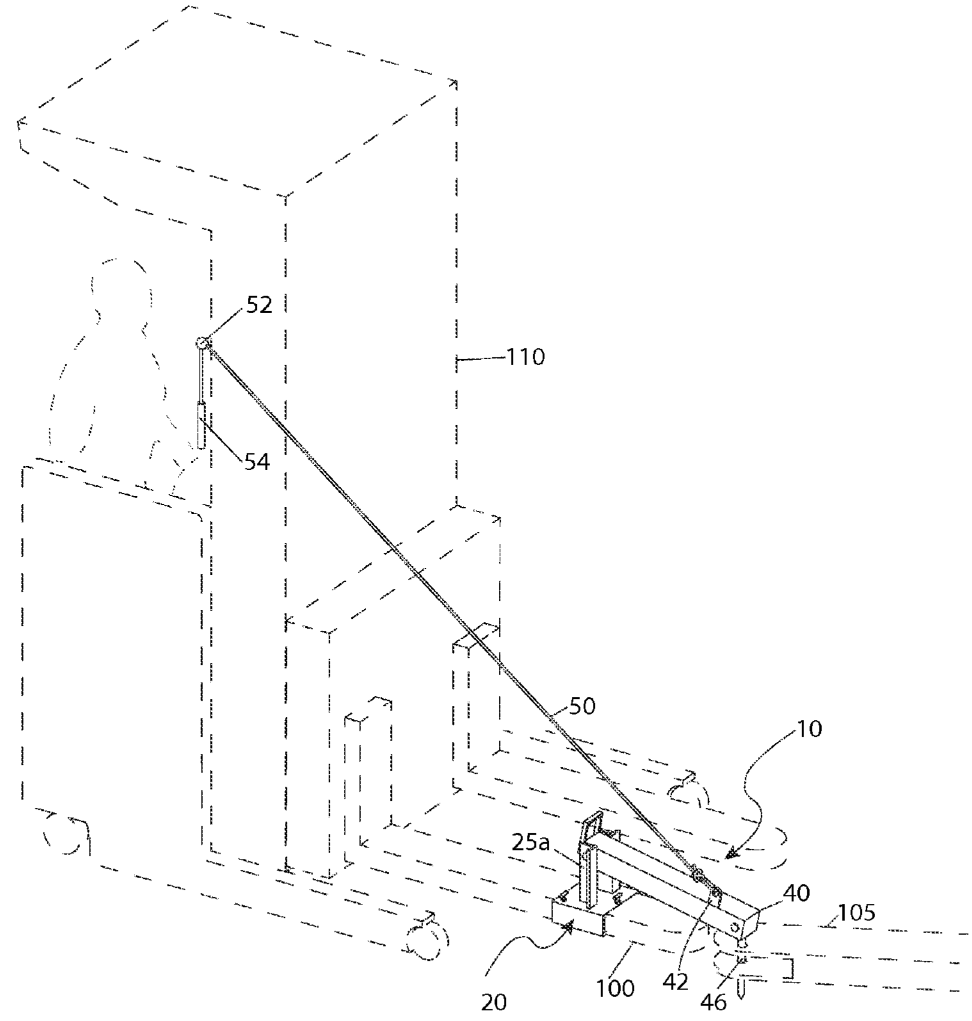
FIG. 2 is an environmental view of the actuator 10 depicting an in-use state, according to a preferred embodiment of the present invention.
Figure 3B:
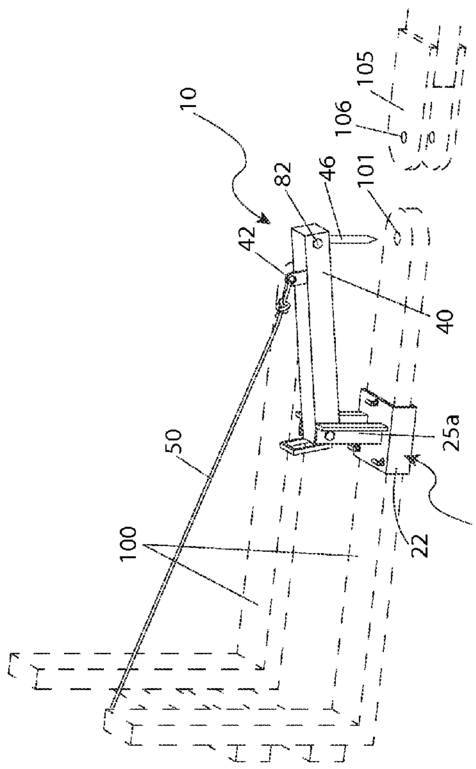
Figure 3A:
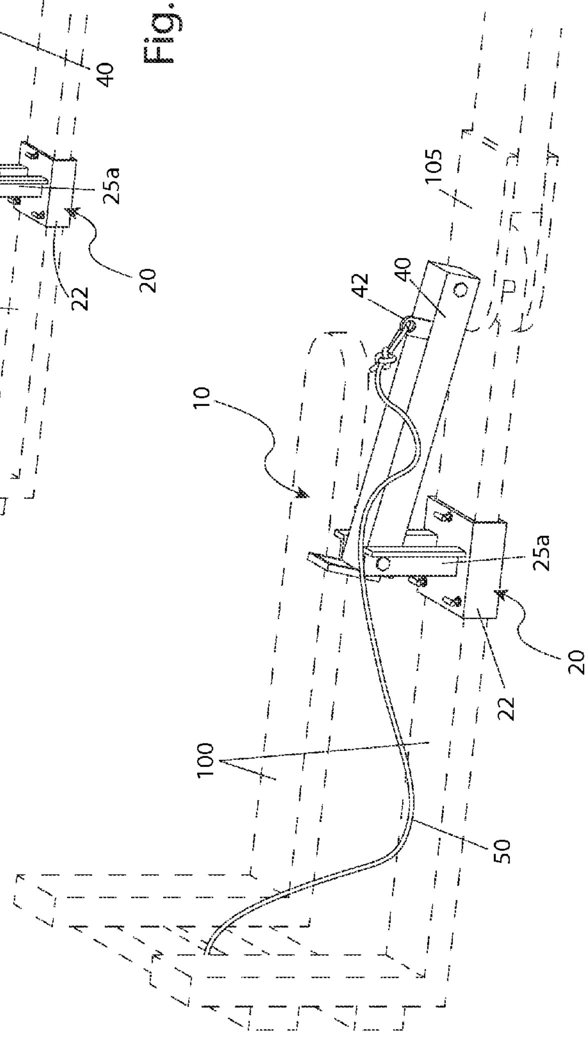

Referring now to FIGS. 2, 3*a*, 3*b*, environmental views of the apparatus 10 depicting including engaged and released in-use states, according to a preferred embodiment of the present invention, are disclosed. The apparatus 10 includes a cable 50 having a permanently attached handle portion 54 at a proximal end preferably positioned at the driver's area of the forklift 110. A distal end of the cable 50 is routed through at least one (1) guiding eyelet 52 mounted to the forklift 110 and attached to a cable bracket portion 42 of the arm weldment portion 40 of the apparatus 10.

The hitching process is accomplished by manipulating the forklift 110 to align the first 101 and second 106 pin apertures, and then inserting the hitch pin 46 therethrough by simply releasing the handle 54 to extend the cable 50 and lower the arm weldment 40 and hitch pin 46 portions. The towed vehicle 105 can then be moved as needed using the forklift 110. To release the towed vehicle 105, the operator pulls on the handle 54 to disengage the hitch pin 46 and drives away from the towed vehicle 105 without having had to dismount from the forklift 110. When not in use, the apparatus 10 may be quickly removed from the fork 100 by loosening the "T"-bolts 80 and sliding the base 22 off of the fork 100—as found on OSHA forklift classes one (1) through seven (7), thereby allowing the forklift 110 to be restored to its original functionality. OSHA forklift classes being defined as Class 1: Electric Motor Rider Trucks; Class 2: Electric Motor Narrow Aisle Trucks; Class 3: Electric Motor Hand Trucks or Hand/Rider Trucks; Class 4: Internal Combustion Engine Trucks (Solid/Cushion Tires); Class 5: Internal Combustion Engine Trucks (Pneumatic Tires); Class 6: Electric and Internal Combustion Engine Tractors; and, Class 7: Rough Terrain Forklift Trucks.

Referring now to FIG. 4, an exploded view of the apparatus 10, according to a preferred embodiment of the present invention, is disclosed. The apparatus 10 works in conjunction with previously machined features upon the fork 100 to provide secure and repeatable positioning of the apparatus 10 upon the fork 100. The base 22 includes a plurality of welded nut fasteners 29 and subjacent fastener apertures 84 along a top surface being correspondingly positioned with receiver aperture portions 102 on the fork 100 so as to provide repeatable installation of the apparatus 10 upon the fork 100. The receiver apertures 102 are formed or machined along a top surface of the fork 100, each having a sufficient diameter to receive a bottom end portion of the "T"-bolt 80 within, and being approximately one-half of an inch (½ in.) in depth. The receiver apertures 102 are envisioned to be partially or shallowly drilled, formed, or cut holes having similar diameters as the "T"-bolts 80, thereby providing a snug accurate fit.

Finally, the receiver apertures 102 are to be positioned with respect to the first pin aperture 101 so as to result in coincidental alignment of the hitch pin portion 46 during insertion into the first pin aperture 101 (see FIG. 1).

FIG. 5 is a sectional view of the hitch pin portion 46 of the apparatus 10 taken along section line A-A (see FIG. 1), according to a preferred embodiment of the present invention, is disclosed. The hitch pin 46 is pivotally attached to the arm weldment 40 via a threaded fastener 82 which passes through fastener aperture portions 84 of the hitch pin 46 and side portions of the arm weldment 40. The threaded fastener 82 and is then secured using a nut fastener 83. The arm weldment 40 is envisioned to be made using a length of rectangular structural tubing and providing a pin opening 44 along a bottom surface. The pin opening 44 and threaded fastener 82 allow the hitch pin 46 to swing freely in a longitudinal direction with respect to the fork 100 to provide a self-centering effect during engagement with the pin apertures 101, 106.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 2.

The method of installing and preparing the apparatus 10 for use may be achieved by performing the following steps: procuring the apparatus 10; preparing the existing forklift 110 to receive the apparatus 10 by machining or cutting a first pin aperture 101 completely through a tip portion of the fork 100; machining or cutting the receiver apertures 102 approximately one-half inch (½ in.) deep into a top surface of the fork 100 at locations which correspond to the position of the "T"-bolt portions 80 of the apparatus 10; installing the "T"-bolts 80 into the welded nut fasteners 29 and corresponding fastener apertures 84, if not previously installed; installing the apparatus 10 onto a fork portion 100 of the existing forklift 110 by inserting a tip portion of the fork 100 through the fork aperture portion 23 of the base weldment 20 until the "T"-bolts 80 are aligned with the receiver aperture portions 102 of the forks 100; tightening the "T"-bolts 80 to secure the apparatus 10 to the fork 100; installing eyelets 52 upon the existing forklift 110 as needed to route the cable 50 between the operator position upon the forklift 110 to the mounted apparatus 10 using appropriate hardware and brackets, resulting in the handle 54 being conveniently located with regards to the operator; routing the free-end of the cable 50 through the aforementioned eyelets 52 to the apparatus 10; and, fastening or tying the end of the cable 50 to the cable bracket portion 42 of the arm weldment 40. The apparatus 10 is now ready for use.

The method of utilizing the apparatus 10 may be achieved by performing the following steps: hitching the existing forklift 110 to a towed vehicle 105 such as a trailer or tote, by motioning the forklift 110 toward the towed vehicle 105; pulling on the handle 54 to extend the cable 50 and raise the hitch pin portion 46 up out of the first pin aperture 101; aligning the first pin aperture portion 101 of the fork 100 with the second pin aperture portion 106 of the towed vehicle 105; motioning the handle 54 to supply slack to the cable 50 causing the hitch pin 46 to drop through the first pin aperture 101 and second pin aperture 106; using the forklift 110 to move the towed vehicle 105 as needed; releasing the towed vehicle 105 by grasping the handle 54 to disengage the hitch pin 46 from the pin apertures 101, 106; and allowing the fork lift operator to drive away from the towed vehicle 105 without having to get off of the forklift 110.

When not needed, the apparatus 10 may be quickly removed from the fork 100 by performing the following steps: loosening the "T"-bolts 80 by hand; raising the hitch pin 46; sliding the base assembly 20 off an end of the fork 100; and, restoring the forklift 110 to its original functionality.

The previously described hitching process represents an improvement over the normal hitching process which requires the operator of the forklift 110 to exit the forklift 110 for both the hitching and unhitching operations.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An actuator, comprising:

a base weldment configured to be affixed to a fork portion of a forklift;

an arm weldment pivotally attached to said base weldment;

a hitch pin rotatingly attached to said arm weldment; and, a cable, having a first end attached to a handle and a second end attached to said arm weldment;

wherein said cable operably controls said arm weldment to guide said hitch pin through aligned apertures of said fork portion and a vehicle to secure said vehicle to said forklift; and, wherein said cable is routed so as to locate said handle adjacent to an operator cab of said forklift.

2. The actuator of claim 1, wherein said base weldment further comprises:

a base member having a fork aperture capable of being aligned with said fork portion;

first post upstanding from a first side of said base member;

a second post upstanding from a second side of said base member;

a stop plate affixed to distal ends of said first and second posts; and, a fastening means for mounting said base member to said fork portion;

wherein said first and second posts are spaced apart to allow positioning of said arm weldment there between; and, wherein said stop plate provides a mechanical limitation to maintain said arm weldment in a forwardly biased state out and away from a center line of said forklift.

3. The actuator of claim 2, wherein said fastening means is a plurality of "T"-bolts and a plurality of welded nut fasteners.

4. The actuator of claim 1, wherein said hitch pin is rotatingly guided through a first pin aperture of said forklift and through an aligned second pin aperture portion of said vehicle.

5. The actuator of claim 1, wherein said base is sized and shaped to be aligned onto a standard OSHA-recognized fork.

6. The actuator of claim 2, wherein said first post and said second post are arranged in a mirror-image and a parallel manner;

wherein said arm weldment is positioned between said first post and said second post.

7. The actuator of claim 2, wherein a threaded fastener is configured to pass through said fastener apertures when aligned within said arm weldment, said first post and said second post and be secured thereto.

8. The actuator of claim 2, wherein said stop plate is shaped as an inverted "U"-shape;

wherein said stop plate is welded to said first post and said second post.

9. The actuator of claim 8, wherein said stop plate includes an inner slot portion providing a clearance for said arm weldment to pivot upwardly when said hitch pin is engaged.

10. The actuator of claim 1, wherein said cable is routed through at least one guiding eyelet mounted to said forklift and attached to a cable bracket portion of said arm weldment.

11. The actuator of claim 1, wherein said base weldment further comprises:

a hollow base member having a fork aperture capable of being aligned with said fork portion;

a first post upstanding from a first side of said base member;

a second post upstanding from a second side of said base member;

a stop plate affixed to distal ends of said first and second posts; and, a fastening means for mounting said base member to said fork portion;

wherein said first and second posts are spaced apart to allow positioning of said arm weldment there between; and, wherein said stop plate provides a mechanical limitation to maintain said arm weldment in a forwardly biased state out and away a center line of said forklift.

12. The actuator of claim 11, wherein said fastening means is a plurality of "T"-bolts and a plurality of welded nut fasteners.

13. The actuator of claim 11, wherein said hitch pin is rotatingly guided through a first pin aperture of said forklift and through an aligned second pin aperture portion of said vehicle.

14. The actuator of claim 11, wherein said base is made of rectangular structural tubing;

wherein said tubing has a central rectangular fork aperture extending there through.

15. The actuator of claim 14, wherein said fork aperture is sized and shaped to be aligned onto a standard OSHA recognized fork.

16. The actuator of claim 11, wherein said first post and said second post are arranged in a mirror-image and a parallel manner;

wherein said arm weldment is positioned between said first post and said second post.

17. The actuator of claim 11, wherein a fastener is configured to pass through said fastener apertures when aligned within said arm weldment, said first post and said second post and be secured thereto.

18. The actuator of claim 11, wherein said stop plate is shaped as an inverted "U"-shape;

wherein said stop plate welded to said first and said second post.

19. The actuator of claim 18, wherein said stop plate includes an inner slot portion providing a clearance for said arm weldment to pivot upwardly when said hitch pin is engaged.

20. The actuator of claim 11, wherein said cable is routed through at least one guiding eyelet mounted to said forklift and attached to a cable bracket portion of said arm weldment.

* * * * *